United States Patent
Sugai et al.

(10) Patent No.: US 10,718,379 B2
(45) Date of Patent: *Jul. 21, 2020

(54) SLIDE MEMBER AND METHOD FOR MANUFACTURING SAME

(71) Applicant: NTN CORPORATION, Osaka (JP)

(72) Inventors: Yousuke Sugai, Aichi (JP); Yoshinori Ito, Aichi (JP); Toshihiko Mouri, Aichi (JP)

(73) Assignee: NTN CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/514,840

(22) PCT Filed: Sep. 2, 2015

(86) PCT No.: PCT/JP2015/074991
§ 371 (c)(1),
(2) Date: Mar. 28, 2017

(87) PCT Pub. No.: WO2016/052064
PCT Pub. Date: Apr. 7, 2016

(65) Prior Publication Data
US 2017/0211623 A1    Jul. 27, 2017

(30) Foreign Application Priority Data

Sep. 30, 2014 (JP) .................. 2014-200728
Sep. 30, 2014 (JP) .................. 2014-200731

(51) Int. Cl.
*F16C 33/12*    (2006.01)
*B22F 3/24*    (2006.01)
(Continued)

(52) U.S. Cl.
CPC ............ *F16C 33/12* (2013.01); *B22F 1/0003* (2013.01); *B22F 3/1035* (2013.01); *B22F 3/16* (2013.01);
(Continued)

(58) Field of Classification Search
CPC ........ B22F 1/0003; B22F 3/1035; B22F 3/16; B22F 3/24; B22F 5/00; B22F 5/106;
(Continued)

(56) References Cited

U.S. PATENT DOCUMENTS

2011/0317949 A1*  12/2011  Ito .............................. C22C 9/00
                                                              384/100
2015/0010254 A1    1/2015  Mouri et al.
(Continued)

FOREIGN PATENT DOCUMENTS

DE    42 32 432    3/1994
EP    3 045 241    7/2016
(Continued)

OTHER PUBLICATIONS

Machine Translation of Nishino et al., JP S59107006, (Translated Apr. 2, 2018). (Year: 1984).*
(Continued)

*Primary Examiner* — David Sample
*Assistant Examiner* — Elizabeth Collister
(74) *Attorney, Agent, or Firm* — Wenderoth, Lind & Ponack, L.L.P.

(57) ABSTRACT

A sliding member (1) is formed of a sintered compact. The sintered compact includes: a base layer (3), which mainly contains an Fe-based structure and further contains 1.0 wt % to 5.0 wt % of Cu, a metal having a melting point lower than a melting point of Cu, and C; and a sliding layer (2), which is sintered together with the base layer (3) in a state of being held in contact with the base layer (3) and has a sliding
(Continued)

surface (A). The sliding layer (2) mainly contains an Fe-based structure containing at least one kind of alloy element selected from Ni, Mo, Mn, and Cr and further contains Cu and C, and the content of Cu in the sliding layer (2) is larger than the content of Cu in the base layer.

11 Claims, 7 Drawing Sheets

(51) Int. Cl.

| | | |
|---|---|---|
| *F16C 17/02* | (2006.01) | |
| *B22F 7/00* | (2006.01) | |
| *B22F 7/06* | (2006.01) | |
| *C22C 38/00* | (2006.01) | |
| *B22F 5/10* | (2006.01) | |
| *B22F 3/10* | (2006.01) | |
| *F16C 33/14* | (2006.01) | |
| *F16C 33/10* | (2006.01) | |
| *B22F 1/00* | (2006.01) | |
| *B22F 3/16* | (2006.01) | |
| *B22F 5/00* | (2006.01) | |
| *B22F 7/02* | (2006.01) | |
| *C22C 38/08* | (2006.01) | |
| *C22C 38/12* | (2006.01) | |
| *C22C 38/16* | (2006.01) | |

(52) U.S. Cl.
CPC .............. *B22F 3/24* (2013.01); *B22F 5/00* (2013.01); *B22F 5/106* (2013.01); *B22F 7/00* (2013.01); *B22F 7/02* (2013.01); *B22F 7/06* (2013.01); *C22C 38/00* (2013.01); *C22C 38/08* (2013.01); *C22C 38/12* (2013.01); *C22C 38/16* (2013.01); *F16C 17/02* (2013.01); *F16C 33/104* (2013.01); *F16C 33/121* (2013.01); *F16C 33/128* (2013.01); *F16C 33/14* (2013.01); *F16C 33/145* (2013.01); *B22F 2003/166* (2013.01); *B22F 2005/103* (2013.01); *B22F 2301/00* (2013.01); *B22F 2301/10* (2013.01); *B22F 2302/45* (2013.01); *B22F 2304/10* (2013.01); *B22F 2998/10* (2013.01)

(58) Field of Classification Search
CPC ...... B22F 7/00; B22F 7/02; B22F 7/06; B22F 2003/166; B22F 2005/103; B22F 2301/00; B22F 2301/10; B22F 2302/45; B22F 2304/10; B22F 2998/10; C22C 38/00; C22C 38/08; C22C 38/12; C22C 38/16; F16C 17/02; F16C 33/104; F16C 33/12; F16C 33/121; F16C 33/128; F16C 33/14; F16C 33/145

See application file for complete search history.

(56) References Cited

U.S. PATENT DOCUMENTS

| | | | |
|---|---|---|---|
| 2015/0043844 A1* | 2/2015 | Hori ................... | F16C 33/104 384/114 |
| 2016/0136727 A1* | 5/2016 | Maetani ............... | B22F 9/04 419/31 |
| 2016/0215820 A1 | 7/2016 | Sugai et al. | |

FOREIGN PATENT DOCUMENTS

| | | | |
|---|---|---|---|
| JP | 59-107006 | 6/1984 | |
| JP | 59-123746 | 7/1984 | |
| JP | 2002-349575 | 12/2002 | |
| JP | 2003-222133 | 8/2003 | |
| JP | 2005-95979 | 4/2005 | |
| JP | 2006-57138 | 3/2006 | |
| JP | 2011094167 A * | 5/2011 | |
| WO | 2013/133381 | 9/2013 | |
| WO | WO-2013133381 A1 * | 9/2013 | .............. B22F 5/106 |
| WO | 2015/037509 | 3/2015 | |

OTHER PUBLICATIONS

Machine Translation of Nishino (JP S59-107006) Translated Apr. 2, 2018 (Year: 1984).*
Translation of Nishino (JP S59-107006) Table 1, column heading by Steven Spar on Jul. 24, 2018 (Year: 1984).*
Chakraborty et al., Austempering of bearing steel for improved mechanical properties, Scripta Materialia, 59 (2008), pp. 247-250 (Year: 2008).*
Machine Translation of JP 2011-094167, Yoshinari et al. (google translated Mar. 18, 2019) (Year: 2011).*
Extended European Search Report dated Jun. 22, 2018 in European Application No. 15846941.1.
International Preliminary Report on Patentability dated Apr. 4, 2017 in International Application No. PCT/JP2015/074991.
International Search Report dated Dec. 1, 2015 in International Application No. PCT/JP2015/074991.

* cited by examiner

| No. | DRY DENSITY g/cm³ | OIL PERCENTAGE Vol.% | RADIAL CRUSHING STRENGTH MPa | VICKERS HARDNESS Hv0.1 | ROCKWELL HARDNESS HRB |
|---|---|---|---|---|---|
| 1 | 5~7 | 17~22 | 500~650 | — | 80~100 |
| 2 | 5~7 | 17~22 | 500~650 | — | 80~100 |
| 3 | 5~7 | 17~22 | 500~650 | 400~700 | 80~100 |
| 4 | 5~7 | 17~22 | 550~650 | 500~700 | 80~100 |
| 5 | 5~7 | 17~22 | 500~600 | 500~700 | 80~100 |

FIG. 15

SLIDE MEMBER AND METHOD FOR MANUFACTURING SAME

TECHNICAL FIELD

The present invention relates to a sliding member having a sliding surface that slides with another member and a method of manufacturing the sliding member.

BACKGROUND ART

A bearing to be used at, for example, a joint section of an arm of construction machinery is required to have excellent wear resistance because remarkably large contact pressure is applied to a bearing surface of the bearing. As the bearing of this type, for example, there are known a bearing obtained by cutting cast steel alloy and a bearing obtained by embedding particles of graphite in a sliding surface in a spotted manner. However, both of the bearings have a problem of high manufacturing cost. Accordingly, instead of those bearings, a sintered bearing made of sintered metal excellent in moldability is proposed. For example, in Patent Literature 1, as a bearing for construction machinery, there is disclosed a sintered bearing obtained by dispersing copper in iron-carbon-based alloy containing a martensitic structure. In this sintered bearing, the entire sintered compact is subjected to hardening after sintering, and then, inner and outer peripheral surfaces and end surfaces thereof are subjected to cutting and grinding to be finished to predetermined dimensions.

Besides the foregoing, in Patent Literature 2, there is disclosed a procedure for forming a green compact having a two-layered structure in which different materials are used on an inner peripheral surface side and an outer peripheral surface side of the sintered compact in order to use different materials in respective sites of the sintered compact so as to impart different functions to the respective sites. Specifically, the enter peripheral surface side of the green compact is formed through use of first powder having high strength, and the inner peripheral surface side is formed through use of second powder excellent in low friction property, and then, the green compact is sintered.

CITATION LIST

Patent Literature 1: JP 2003-222133 A
Patent Literature 2: JP 2005-95979 A

SUMMARY OF INVENTION

Technical Problem

In order to set the friction coefficient of the inner peripheral surface to be low in the sintered compact having a two-layered structure disclosed in Patent Literature 2, it is necessary to form a copper-rich layer on the inner peripheral surface of the sintered compact. Meanwhile, in order to ensure high strength, in particular, high strength as required in a bearing arranged in a joint section of an arm of construction machinery disclosed in Patent Literature 1, on the outer peripheral surface side of the sintered compact having a two-layered structure, it is necessary to form the outer peripheral surface side of the sintered compact with a structure (pearlite structure) mainly containing iron-carbon. In this case, the green compact is sintered at a temperature that is significantly higher than the melting point (1,083° C.) of copper.

However, when the green compact is sintered at high temperature as described above, copper contained in the copper-rich layer on the inner peripheral surface is completely melted. The molten copper is pulled into a layer having a low copper concentration on the outer peripheral surface side, and hence a sufficient copper structure is not formed on the inner peripheral surface after sintering. Meanwhile, the strength required on the outer peripheral surface side of the sintered compact cannot be ensured merely by decreasing the sintering temperature Thus, in this situation, the original purpose of the sintered compact having a two-layered structure of satisfying both high strength and a sliding property cannot be achieved.

In view of the foregoing, it is an object of the present invention to provide a sliding member capable of ensuring strength of a sintered compact and enhancing the sliding property and durability of a sliding surface, and a method of manufacturing the sliding member.

Solution to Problem

In order to achieve the above-mentioned object, according to one embodiment of the present invention, there is provided a sliding member, which is forced of a sintered compact and has a sliding surface that slides with another member, the sliding member comprising: a base layer, which mainly contains an Fe-based structure and further contains 1.0 wt % to 5.0 wt % of Cu, a metal having a melting point lower than a melting point of Cu, and C; and a sliding layer, which is sintered together with the base layer in a state of being held in contact with the base layer and has the sliding surface, the sliding layer mainly containing an Fe-based structure that contains an alloy element and a Cu-based structure, and further containing C, the sliding layer having a content of Cu larger than a content of Cu in the base layer, wherein all the alloy element contained in the sliding layer is alloyed with the Fe-based structure.

When the base layer mainly containing an Fe-based structure (structure containing Fe as a main component) contains Cu and a metal having a melting point lower than that of Cu, the low-melting-point metal contained in the base layer is first melted during sintering, and the melt of the low-melting-point metal wets the surface of each Cu particle. Therefore, Cu is melted at a temperature lower than the melting point thereof, and the molten Cu and the low-melting-point metal permeate Fe particles to diffuse into the Fe particles. With this, the Fe particles are firmly bound together to increase the strength of the base layer. Therefore, even when the sintering temperature is decreased as compared to the case of an iron-based sintered compact, the strength of the bearing can be ensured. When the sintering temperature is decreased, a large amount of the Cu particles contained in the sliding layer retails a solid state without being melted during sintering. Therefore, the amount of the Cu particles pulled into the base layer from the sliding layer becomes small, with the result that a Cu-based structure (structure containing Cu as a main component) in an intended amount can be distributed onto the sliding surface. Even when a part of the Cu particles of the sliding layer is melted during sintering, the melting amount of the Cu particles can be reduced by setting the sintering temperature to be lower (for example, from 1,070° C. to 1,120° C.) than the sintering temperature (generally 1,130° C. or more) of the iron-based sintered compact. Through the foregoing, both the sliding property on the sliding surface and the strength of the sintered compact can be satisfied.

Further, when all the alloy element contained in the sliding layer is alloyed with the Fe-based structure, remaining austenite after sintering is reduced. Therefore, the hardness and strength of the sliding surface can be increased.

In the sliding member, when an element (at least one kind selected from Ni, Mo, Mn, and Cr) for enhancing a hardening property is incorporated as the alloy element contained in the sliding layer, at least a part of the Fe-based structure contained in the sliding layer can be subjected to martensitic transformation and bainitic transformation in a cooling process after sintering (sinter-hardening) without performing heat treatment, such as carburizing and quenching. With this, the sliding layer including the sliding surface is increased in hardness, and hence the wear resistance of the sliding surface can be enhanced. Further, along with this, the strength of the base layer is increased through diffusion of Cu and the low-melting-point metal into the Fe particles in the base layer, and hence the strength of the entire sintered compact is increased. Thus, the sliding member of the present invention can also be used as a sliding member that is frequently subjected to a shock load and is used under high contact pressure, for example, a bearing to be used in a joint section of an arm of construction machinery.

Meanwhile, the base layer occupying a large part of the sintered compact does not basically contain the above-mentioned alloy element, and hence the Fe-based structure of the base layer is not subjected to martensitic transformation or bainitic transformation. When the alloy element for enhancing a hardening property is blended only in the sliding layer as described above, the usage amount of the expensive alloy element can be reduced to decrease cost. Further, the base layer becomes softer than the sliding layer, and hence dimensional correction of the sintered compact can be performed by sizing (step of subjecting the sintered compact to compression reshaping in a die assembly). In the configuration of Patent Literature 1, the entire sintered compact is hardened by hardening after sintering, and hence the dimensional correction of the sintered compact needs to be performed by machining, such as cutting and grinding. However, the sliding member of the present invention can be subjected to dimensional correction by sizing, and hence machining is not required. The hardening step after sintering is not required, either. The hardening step and the machining step after sintering can be omitted as described above, and hence the cost of the sliding member can be further reduced as compared to the invention disclosed in Patent Literature 1.

It is preferred that the Cu-based structure of the sliding layer be formed of copper powder having a particle diameter of less than 45 µm in a ratio of from 70% to 100%. When the copper powder is reduced in particle diameter as described above, pores can be reduced in size, which are formed in the sliding layer when a part of the copper powder contained in the sliding layer is melted and moves to the base layer during sintering. Therefore, the strength of the sliding surface can be increased to prevent the sliding surface from being deformed by a shock load or the like. Further, the copper particles easily diffuse into the Fe particles. Therefore, the binding strength between the Fe particles of the sliding layer can be increased to further increase the strength of the sliding surface.

Further, it is preferred that the sliding layer further contain a metal having a melting point lower than that of Cu. With this, Cu contained in the sliding layer easily diffuses into the Fe particles during sintering, and the binding strength between the Fe particles is increased. Therefore, the mechanical strength of the sliding layer and the entire sliding member can be increased.

It is preferred that phosphorus (P) be used as the low-melting-point metal contained in the base layer. Further, it is preferred that the base layer contain the low-melting-point metal in a content of from 0.1 wt % to 0.6 wt % with respect to Fe.

When the content of Cu in the sliding layer is set to 10 wt % or more and 30 wt % or less, an increase in cost caused by the excessive use of copper can be prevented while the sliding property of the sliding surface is ensured. It is necessary to incorporate Cu also into the base layer in order to bind the Fe particles in the base layer together. However, in this case, the usage amount of expensive copper can be suppressed to decrease cost by setting the content of Cu in the base layer to be smaller than the content of Cu in the sliding layer.

Further, according to one embodiment of the present invention, there is provided a sliding member, which is formed of a sintered compact and has a sliding surface that slides with another member, the sliding member comprising: a base layer that mainly contains an Fe-based structure and further contains 1.0 wt % to 5.0 wt % of Cu, a metal having a melting point lower than a melting point of Cu, and C; and a sliding layer that is sintered together with the base layer in a state of being held in contact with the base layer and has the sliding surface, the sliding layer mainly containing an Fe-based structure that contains an alloy element and a Cu-based structure, and further containing a metal having a melting point lower than a melting point of Cu, and C, the sliding layer having a content of Cu larger than a content of Cu in the base layer.

When the sliding layer contains the metal having a melting point lower than that of Cu as described above, Cu contained in the sliding layer easily diffuses into the Fe particles during sintering. Therefore, the binding strength between the Fe particles can be increased to increase the mechanical strength of the sliding layer and the entire sliding member.

The above-mentioned sliding member may be obtained by: preparing first powder mainly containing Fe-based powder and further containing 1.0 wt % to 5.0 wt % of Cu, a metal having a melting point lower than a melting point of Cu, and C; preparing second powder mainly containing Fe-based powder that contains an alloy element and further containing Cu and C, the second powder having a content of Cu larger than a content of Cu in the first powder, the second powder being free of simple substance powder of the alloy element; forming a first powder filling part and a second powder filling part by arranging a partition member in a die assembly; filling the first powder into the first powder filling part and filling the second powder into the second powder filling part; simultaneously compressing the first powder and the second powder in the die assembly under a state in which the partition member is removed, to thereby form a green compact; sintering the green compact to form a base layer having a composition corresponding to the first powder and a sliding layer having a composition corresponding to the second powder in an integrated manner; and subjecting at least the sliding surface of the sintered compact to sizing.

In this case, it is preferred that at least one kind selected from Ni, Mo, Mn, and Cr be used as the alloy element. Further, it is preferred that the green compact be sintered at from 1,070° C. to 1,120° C. Further, it is preferred that the second powder contain, as Cu, copper powder having a particle diameter of less than 45 µm in a ratio of from 70% to 100%. In addition, the second powder may also contain a metal having a melting point lower than that of Cu.

When the first powder and the second powder are simultaneously compressed to form a green compact, the large difference in apparent density between the first powder and the second powder, if any, causes an obstacle for the forming of the green compact. In contrast, when the thickness of the base layer is set to be larger than that of the sliding layer, and the apparent density of the first powder is set to be smaller than that of the second powder, a green compact can be formed. That is, even when there is a slight difference in apparent density between the first powder and the second powder, a green compact can be formed easily.

The above-mentioned sliding member may also be obtained by: preparing first powder mainly containing Fe-based powder and further containing 1.0 wt % to 5.0 wt % of Cu, a metal having a melting point lower than a melting point of Cu, and C; preparing second powder mainly containing Fe-based powder that contains an alloy element and further containing Cu, a metal having a melting point lower than a melting point of Cu, and C, the second powder having a content of Cu larger than a content of Cu in the first powder; forming a first powder filling part and a second powder filling part by arranging a partition member in a die assembly; filling the first powder into the first powder filling part and filling the second powder into the second powder filling part; simultaneously compressing the first powder and the second powder in the die assembly under a state in which the partition member is removed, to thereby form a green compact; sintering the green compact to form a base layer having a composition corresponding to the first powder and a sliding layer having a composition corresponding to the second powder in an integrated manner; and subjecting at least the sliding surface of the sintered compact to sizing.

Advantageous Effects of Invention

As described above, according to the present invention, the sliding property and durability of the sliding surface can be enhanced while the strength of the sintered compact is ensured.

DESCRIPTION OF EMBODIMENTS

A sintered bearing is exemplified as an example of a sliding member of the present invention, and an embodiment thereof is described below.

Figure 1:
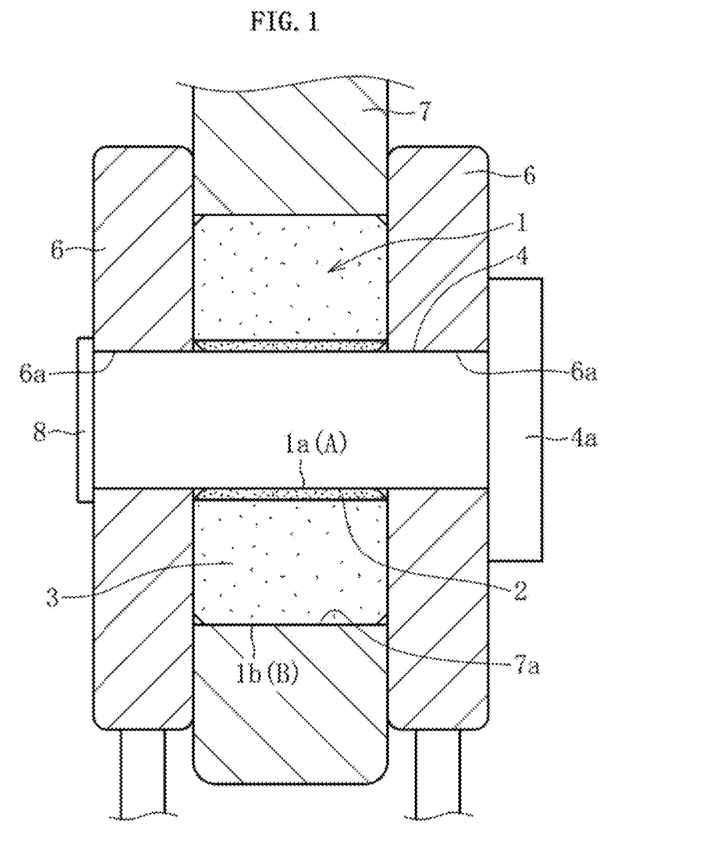
FIG. 1 is a sectional view of a joint section in which a sintered bearing of the present invention is incorporated.

The sintered bearing is suitable for use in a joint section configured to join arms (including a boom, a bucket, and the like) of construction machinery, such as a hydraulic shovel vehicle and a bulldozer. FIG. 1 is a view for illustrating a schematic structure of such joint section. As illustrated in FIG. 1, in the joint section, a tip end of a second arm 7 is inserted into an inner side of a first arm 6 formed into a forked shape. A mounting hole 7a is formed at the tip end of the second arm 7, and an outer peripheral surface 1b of a sintered bearing 1 formed of a sintered compact is fixed onto the mounting hole 7a through use of appropriate mounting means, such as press-fitting. When a pin 4 is inserted into a pin hole 6a formed in each of the forked portions of the first arm 6 and an inner peripheral surface 1a of the sintered bearing 1, the first arm 6 and the second arm 7 are coupled to each other in a relatively rotatable manner. The pin 4 is fixed onto the first arm 6. Therefore, when the first arm 6 and the second arm 7 are relatively swung, the pin 4 is relatively rotated with respect to the inner peripheral surface 1a of the bearing 1. Reference symbol 8 denotes a retainer configured to regulate the dropout of the pin 4. In the joint section, the maintenance of the bearing 1 and the pin 4 can be performed by removing a head part 4a of the pin 4 or the retainer 8 from an axis part of the pin 4 and pulling out the pin 4, to thereby separate the first arm 6 and the second arm 7 from each other.

[Basic Configuration of Sintered Bearing]

Figure 2:
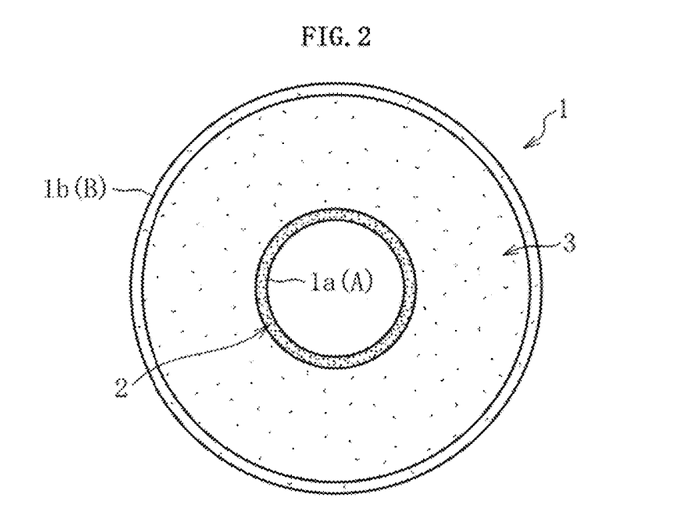
FIG. 2 is a front view of the sintered bearing.

As illustrated in FIG. 1 and further in FIG. 2, the sintered bearing 1 is formed of a cylindrical sintered compact comprising a sliding layer 2 on a radially inner side and a base layer 3 on a radially outer side in an integrated manner so that the sliding layer 2 and the base layer 3 are held in contact with each other. In the illustrated example, the sintered bearing 1 comprises only the sliding layer 2 and the base layer 3, and both the layers have a tubular shape, in particular, a cylindrical shape. An inner peripheral surface of the sliding layer 2 forming the inner peripheral surface 1a of the sintered bearing 1 has a true circle shape in cross-section that is straight in an axial direction and forms a sliding surface A (bearing surface) configured to support the axis part of the pin 4 (hereinafter referred to as "axis 4") to be inserted into an inner periphery in a relatively rotatable manner. The outer peripheral surface 1b (outer peripheral surface of the base layer 3 in this embodiment) of the sintered bearing 1 has a true circle shape in cross-section that is straight in the axial direction and forms a mounting surface B to be mounted on another member, such as the second arm 7. Each axial end surface of the sintered bearing 1 is a flat surface extending in a direction orthogonal to the axial direction. Chamfers are formed between each axial end surface of the sintered bearing 1 and the inner peripheral surface 1a and the outer peripheral surface 1b, respectively.

When the sintered bearing 1 is used in the above-mentioned joint section, the sintered bearing 1 is formed, for example, so as to have an inner diameter of from 30 mm to 100 mm and a radial thickness of from 5 mm to 50 mm. The radial thickness of the sliding layer 2 is set to about 1% to about 20% (preferably from about 2% to about 10%) of the radial thickness of the sintered bearing 1, and an actual thickness dimension thereof is set to, for example, from about 0.3 mm to about 2 mm. The reason for this is as follows. When the sliding layer 2 is extremely thin, the filling property of raw material powder during molding is deteriorated and an allowable wear limit is reduced. When the sliding layer 2 is extremely thick, the usage amounts of an element for enhancing a hardening property described later and copper are increased, resulting in an increase in cost. Lubricating oil is impregnated into fine pores of the sintered bearing 1 having a porous shape. When the sliding surface A and the axis 4 are relatively rotated, the lubricating oil retained in the fine pores in the sintered bearing 1 seeps out from surface pores formed in the bearing surface A, and thus lubricating is performed between the bearing surface A and the axis 4.

The sintered bearing 1 of the present invention has a two-layered structure in which the sliding layer 2 and the base layer 3 have different metal compositions. The sintered bearing 1 having a two-layered structure is manufactured successively through a compression molding step, a sintering step, a sizing step, and an oil-impregnating step described below.

Figure 7:
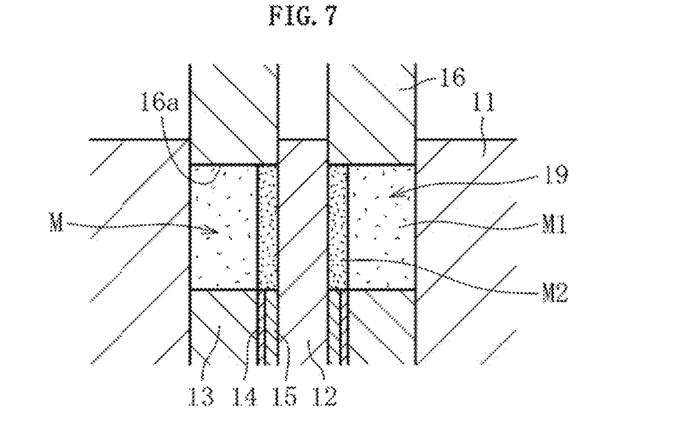
FIG. 7 is a sectional view for illustrating a state in which mixed powders are compressed by an upper punch in the compression molding step.

In the compression molding step, there is adopted a so-called two-color molding procedure involving supplying a material for the sliding layer 2 and a material for the base layer 3 into the same molding die assembly and simultaneously molding the materials. The two-color molding involves forming two space-like powder filling parts on a radially outer side and a radially inner side in the molding die assembly and filling powder into each powder filling part. The two-color molding is performed through use of, for example, a die assembly illustrated in FIG. 3. The die assembly comprises a die 11, a core pin 12 arranged on an inner periphery of the die 11, an outer lower punch 13 arranged between an inner peripheral surface 11a of the die 11 and an outer peripheral surface 12a of the core pin 12, a partition member 14, an inner lower punch 15, and an upper punch 16 (see FIG. 7). The outer lower punch 13, the partition member 14, and the inner lower punch 15 have concentric cylindrical shapes and can each be raised and lowered independently.

Figure 3:
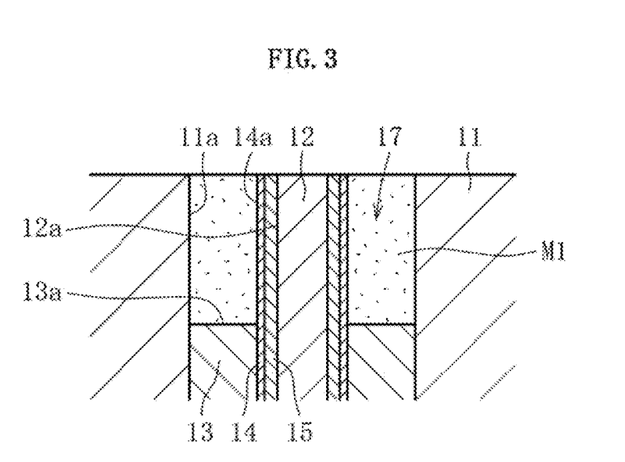
FIG. 3 is a sectional view for illustrating a state in which first powder is filled in a compression molding step of the sintered bearing.

First, as illustrated in FIG. 3, the partition plate 14 and the inner lower punch 15 are raised to an upper end position, and the outer lower punch 13 is lowered to a lower end position, to thereby form a first powder filling part 17 on a radially outer side through use of the inner peripheral surface 11a of the die 11, an outer peripheral surface 14a of the partition plate 14, and an end surface 13a of the outer lower punch 13. First powder M1 corresponding to the base layer 3 is filled into the first powder filling part 17. The composition of the first powder M1 is described later.

Figure 4:
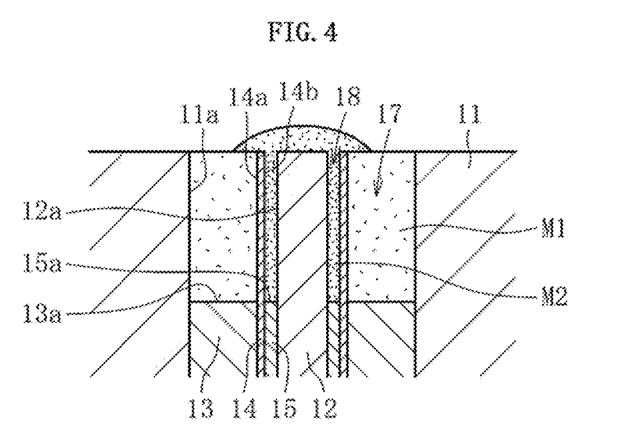
FIG. 4 is a sectional view for illustrating a state in which second powder is filled in the compression molding step.

Next, as illustrated in FIG. 4, the inner lower punch 15 is lowered to the lower end position, to thereby form a second powder filling part 18 on a radially inner side through use of an inner peripheral surface 14b of the partition plate 14, the outer peripheral surface 12a of the core pin 12, and an end surface 15a of the inner lower punch 15. The second powder filling part 18 is formed in a state of being isolated from the first powder filling part 17, and second powder M2 corresponding to the sliding layer 2 is filled into the second powder filling part 18. In this case, the second powder M2 is caused to overflow the inner powder filling part 18 so as to cover an upper portion of the partition plate 14. The composition of the second powder M2 is described later.

Figure 5:
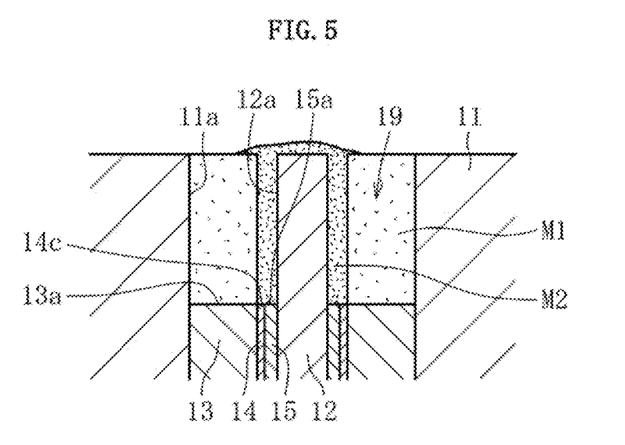
FIG. 5 is a sectional view for illustrating a state in which a partition member is lowered in the compression molding step.
Figure 6:
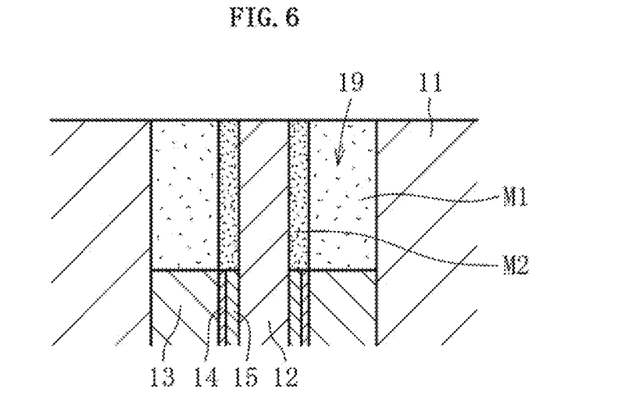
FIG. 6 is a sectional view for illustrating a state in which a surplus of the powder is removed in the compression molding step.

Next, as illustrated in FIG. 5, the partition plate 14 is lowered. Thus, the second powder M2 enters a space corresponding to the partition member 14, and the first powder M1 and the second powder M2 are brought into contact with each other. In this manner, a powder filling part 19 formed by the inner peripheral surface 11a of the die 11, the end surface 13a of the outer lower punch 13, an end surface 14c of the partition plate 14, the end surface 15a of the inner lower punch 15, and the outer peripheral surface 12a of the core pin 12 is filled with the first powder M1 and the second powder M2 in a double-layer state. Then, a surplus of the second powder M2 overflowing the powder filling part 19 is removed (see FIG. 6).

Figure 8:
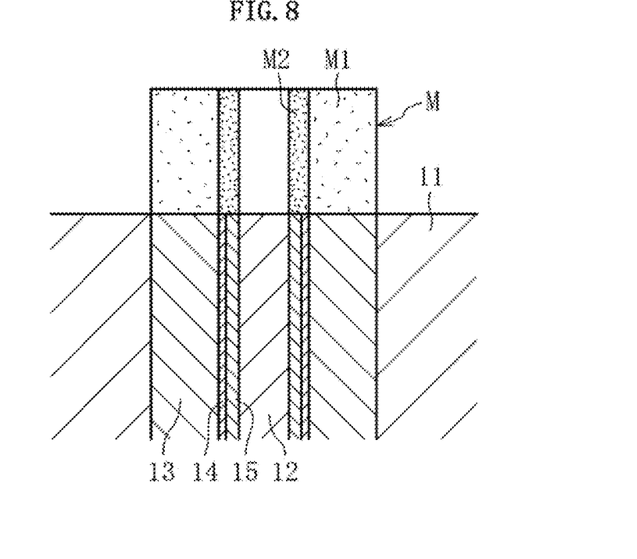
FIG. 8 is a sectional view for illustrating a state in which a green compact is taken out of a die assembly in the compression molding step.

Under a state in which the partition member 14 is removed from the die assembly as described above, as illustrated in FIG. 7, the upper punch 16 is lowered to press an end surface 16a of the upper punch 16 against the powders M1 and M2, to thereby compress the powders M1 and M2 filled into the powder filling part 19 with the upper punch 16, the lower punches 13 and 15, the partition member 14, and the die 11 to form a green compact M. Then, as illustrated in FIG. 8, the outer lower punch 13, the partition plate 14, and the inner lower punch 15 are raised, and the green compact M is removed from the die assembly.

The first powder M1 corresponding to the base layer 3 mainly contains Fe-based powder and further contains copper (Cu), a metal having a melting point lower than that of Cu, and carbon (C). Specifically, powder containing iron powder, copper powder, and graphite powder as main components and further containing a metal having a melting point lower than that of Cu is used as the first powder M1.

As the iron powder, reduced iron powder, atomized iron powder, or the like may be used, but porous reduced iron powder excellent in oil-impregnating property is preferably used. As the copper powder, electrolytic copper powder or atomized copper powder may be used. However, it is more preferred that electrolytic copper powder having a dendritic shape over the entire particles be used because the strength of the green compact can be increased, and copper easily diffuses into Fe particles during sintering. Further, as the low-melting-point metal, a metal having a melting point lower than that of copper, specifically, a metal having a melting point of 700° C. or less, for example, tin (Sn), zinc (Zn), or phosphorus (P) may be used. Of the low-melting-point metals, phosphorus is melted to permeate iron and copper particles during sintering, to thereby accelerate the sintering of Cu—Fe. That is, phosphorus has satisfactory compatibility with both iron and copper. Therefore, it is preferred that phosphorus be used as the low-melting-point metal. When, for example, iron-phosphorus alloy powder ($Fe_3P$) is mixed with copper powder and graphite powder, the following advantages are obtained. The first powder M1 is easily mixed and molded, and the safety is high. In this case, a mixture of iron-phosphorus alloy powder and pure iron powder may also be used as the Fe-based powder. When a low-melting-point metal (for example, Sn) other than phosphorus is used, simple substance powder of the low-melting-point metal may also be added instead of an alloy with iron powder or the like.

The blending amount of each powder in the first powder M1 is set to, for example, 1.0 wt % to 5.0 wt % (preferably 2.0 wt % to 3.0 wt %) of copper powder, 0.5 wt % to 0.8 wt % of graphite powder, and the balance of iron powder and alloyed steel powder of iron and phosphorus. When the blending amount of the copper powder is extremely small, the strength of the base layer 3 is decreased. When the blending amount of the copper powder is extremely large, the diffusion of carbon is inhibited to decrease the strength and hardness of the sintered compact. Therefore, the above-mentioned range is adopted. The ratio of phosphorus with respect to iron is set to from 0.1 wt % to 0.6 wt % (preferably from 0.3 wt % to 0.5 wt %), and the blending ratio between the alloyed steel powder and the iron powder is arbitrarily regulated so that the above-mentioned value is obtained. The blending ratio of the alloyed steel powder with respect to the iron powder may be set to, for example, from about 1/30 to about 1/20 in a weight ratio (alloyed steel powder/iron powder). Phosphorus that is a low-melting-point metal is blended so as to increase the strength of the sintered compact through acceleration of the diffusion of copper into iron particles. When the blending amount of phosphorus is extremely small, such effect becomes insufficient. When the blending amount of phosphorus is extremely large, the low-melting-point metal is segregated, and the sintered compact becomes brittle to decrease the strength. Therefore, the above-mentioned range is adopted. Further, the graphite powder is blended so as to cause iron and carbon to react with each other during sintering, to thereby form a hard pearlite phase. When the blending amount of the graphite powder is small, the strength of the base layer cannot be ensured. When the blending amount of the graphite powder is extremely large, iron has a cementite structure to become brittle, to thereby decrease the strength. Therefore, the above-mentioned range is adopted.

Meanwhile, the second power M2 corresponding to the sliding layer 2 mainly contains Fe-based powder containing an alloy element for enhancing a hardening property and further contains Cu and C. Specifically, a mixture of alloyed steel powder containing an alloy element, copper powder, and graphite powder is used as the second powder M2. The content of Cu in the second powder M2 is set to be larger than that of Cu in the first powder M1.

As the alloy element for enhancing a hardening property, any one kind or two or more kinds selected from nickel (Ni), molybdenum (Mo), manganese (Mn), and chromium (Cr) are used. In this embodiment, Ni and Mo are selected, and alloyed steel powder of Ni, Mo, and iron (Fe—Ni—Mo-based alloyed steel powder) is used. The alloy element for enhancing a hardening property is added so as to cause martensitic transformation and bainitic transformation, to thereby perform sinter hardening as described later. Ni and Mo are preferred because Ni and Mo are particularly excellent in the effect to enhance a hardening property. As the alloyed steel powder of the second powder M2, completely alloyed powder is preferred. As the copper powder, electrolytic copper powder is preferred, but atomized copper powder may also be used.

It is preferred that the blending amount of each powder in the second powder M2 be set to 10 wt % to 30 wt % (preferably 15 wt % to 20 wt %) of copper powder, 0.5 wt % to 2.0 wt % of graphite powder, and the balance of alloyed steel powder. Further, the kind and amount of the alloyed steel powder are selected so that the ratio of Ni in the second powder M2 falls within a range of from 1.0 wt % to 4.0 wt %, and the ratio of Mo falls within a range of from 0.5 wt % to 1.5 wt %. The blending amounts of Ni and Mo are determined based on the effect to enhance moldability and a hardening property. When the blending amount of copper is extremely small, the sliding property of the sliding surface 2a is decreased. When the blending amount of copper is extremely large, the bearing surface becomes extremely soft to cause a problem in wear resistance. Therefore, the above-mentioned range is adopted. The graphite powder of the second powder M2 is blended so as to cause iron and carbon to react with each other during sintering, to thereby mainly form a martensite phase and a bainite phase and so as to further serve as a solid lubricant. The upper limit and the lower limit of the blending ratio of the graphite powder are determined for the same reason as that for determining the blending ratio of the graphite powder in the first powder M1.

Both the first powder M1 corresponding to the base layer 3 and the second powder M2 corresponding to the sliding layer 2 have an apparent density of from 1.0 g/cm$^3$ to 4.0 g/cm$^3$. A difference in apparent density between the powders is inevitably caused due to the difference in composition therebetween, and it is expected that this difference in apparent density, for example, causes the green compact M to collapse when the first powder M1 and the second powder M2 are simultaneously molded in the compression molding step, with the result that it becomes difficult to form the green compact M. However, when the difference in density is 0.5 g/cm$^3$ or less under a state in which the thickness of the sliding layer 2 is sufficiently smaller than that of the base layer 3 as in this embodiment (the thickness of the sliding layer 2 is from 1% to 20%, preferably from 2% to 10% of the thickness of the sintered bearing as described above), and in which the apparent density of the first powder M1 is lower than that of the second powder M2, the green compact M can be formed even when the first powder M1 and the second powder M2 are simultaneously molded. Thus, if is preferred that the apparent density of the first powder M1 be set to be smaller than that of the second powder M1, and the difference in density be set to be 0.5 g/cm$^3$ or less.

Figure 10:
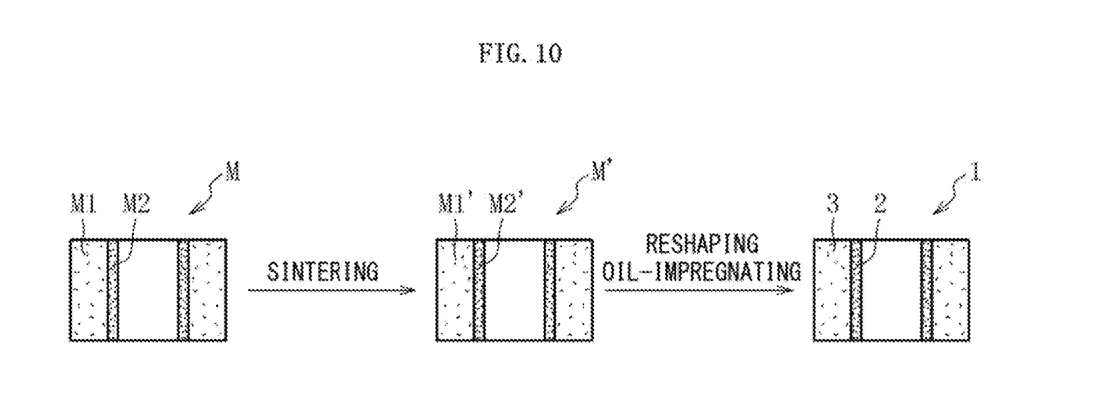
FIG. 10 is a sectional view for illustrating a manufacturing process after the compression molding step.

As illustrated in FIG. 10, when the green compact M having passed through the compression molding step is sintered in the sintering step, a sintered compact M is obtained. In this case, the base layer 3 is sintered together with the sliding layer 2 in a state of being held in contact with the sliding layer 2, and hence the sliding layer 2 and the base layer 3 can be integrated with each other after sintering. As atmosphere gas to be used in sintering, gas containing CO is used. The sintering temperature is set so as to be higher than the temperature (about 900° C.) at which iron and carbon start reaction, but is set so as not to significantly exceed the melting point (1,083° C.) of copper. Ideally, it is desired that sintering be performed at a temperature at which the temperature of the entire structure in the sintered compact M' does not exceed the melting point of copper, but it is actually difficult to control temperature as such. Therefore, the sintering temperature is set to a temperature in the vicinity of the melting point of copper, for example, from 1,070° C. to 1,120° C. This temperature is lower than the temperature (1,130° C. or more) in a general furnace during sintering of an iron-based sintered compact.

Figure 9:
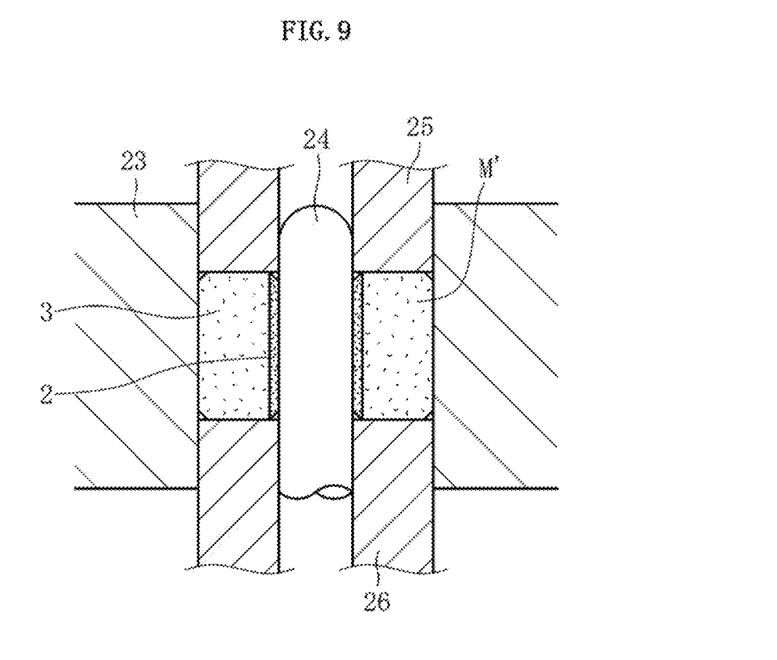
FIG. 9 is a sectional view for illustrating a die assembly to be used in a sizing step of the sintered bearing.

The sintered compact M' having passed through the sintering step is transferred to the sizing step to be subjected to dimensional correction (reshaping). In this embodiment, as illustrated in FIG. 9, an inner peripheral surface, an outer peripheral surface, and both end surfaces of the sintered compact M' are pressed with a sizing die assembly including a die 23, a core rod 24, and upper and lower punches 25 and 26, and thus the sintered compact M' is subjected to sizing. After that, a lubricant is impregnated into inner pores of the sintered compact M' in the oil-impregnating step, to thereby complete the sintered bearing 1. The sintered compact M' may be subjected to tempering after sintering in order to remove remaining austenite of the sintered compact M'. Unless otherwise particularly required, the sintered compact M' can also be used without being impregnated with a lubricant.

During sintering in the sintering step, first, phosphorus contained in the first powder M1 is melted. The melt of phosphorus wets the surface of each Cu particle. Therefore, Cu is melted at a temperature lower than the melting point thereof, and the molten Cu and phosphorus permeate Fe particles to diffuse into the Fe particles. With this, the Fe particles are firmly bound together to increase the strength of the base layer 3. Further, sintering is performed at a temperature higher than the reaction starting temperature of iron and carbon, and hence a hard pearlite phase (a part thereof is a ferrite phase) is formed in the Fe structure. Through the above-mentioned sintering process, the strength of the base layer 3 is ensured. Therefore, even when the sintering temperature is set to be lower than the sintering temperature of a general iron-based sintered product, the strength required of the base layer 3 can be ensured. When the sintering temperature is set to be lower than the sintering temperature of the iron-based sintered product, a large amount of copper contained in the second powder M2 forming the sliding layer 2 retains a solid state without being melted. Therefore, copper present in the sliding layer 2, in particular, the sliding surface A is not pulled into the base layer 3, and copper in an intended amount can be distributed onto the sliding surface A (the distribution amount of copper in the sliding surface A is set to from 10% to 30% in an area ratio). Therefore, both the sliding property of the sliding surface A and the strength of the sintered compact M' can be satisfied.

Further, the sliding layer 2 contains elements for enhancing a hardening property, such as Ni and Mo. Therefore, the Fe-based structure of the sliding layer 2 can be subjected to martensitic transformation and bainitic transformation to be increased in hardness (sinter hardening) while passing through a cooling zone of a continuous sintering furnace without separately performing heat treatment, such as carburizing and quenching. With this, the sliding surface A is increased in hardness, and the wear resistance thereof can be enhanced. Further, together with this, the strength of the base layer 3 is increased due to phosphorus in the base layer 3, and hence the strength (radial crushing strength, etc.) of the entire sintered compact is increased. Thus, the sliding member of the present invention can also withstand the use as a bearing in a joint section of an arm of construction machinery that is frequently subjected to a shock load and is used under high contact pressure.

Meanwhile, the base layer 3 occupying a large part of the sintered compact M' does not contain the alloy element for enhancing a hardening property. Therefore, the usage amount of the expensive element in the entire bearing can be reduced to decrease cost of the bearing. Further, the base layer 3 is not subjected to sinter hardening, and martensitic transformation and bainitic transformation do not occur therein. Therefore, the base layer 3 becomes softer than the sliding layer 2. Therefore, the dimensional correction of the sintered compact M' can be performed in the sizing step. In the above-mentioned configuration of Patent Literature 1, the entire sintered compact is hardened by hardening after sintering, and hence the dimensional correction of the sintered compact needs to be performed by machining, such as cutting and grinding. However, the sintered compact M' of the present invention can be subjected to dimensional correction by sizing, and hence post-processing by machining is not required. Further, even when hardening after sintering is not performed, the required sufficient strength (for example, a radial crushing strength of 500 MPa or more) can be ensured. The hardening step and the machining step after sintering can be omitted as described above, and hence the cost of the sintered bearing 1 can be further reduced as compared to that of the invention disclosed in Patent Literature 1.

Graphite in the base layer 3 is all formed into carbon to diffuse into Fe. In contrast, graphite in the sliding layer 2 partially remains as particles even after sintering, and a graphite structure 33 (graphite phase) is formed in the sliding surface A. The reason for this is as follows. The content of copper is larger in the sliding layer 2 than in the base layer 3, and the copper particles cover a part of the surface of each iron particle, with the result that iron and carbon do not easily react with each other. As described above, a larger amount of the graphite phase is present in the sliding layer 2 as compared to the base layer 3. Therefore, the graphite phase is allowed to serve as a solid lubricant, and thus the sliding property of the sliding surface A can be enhanced.

Figure 11:
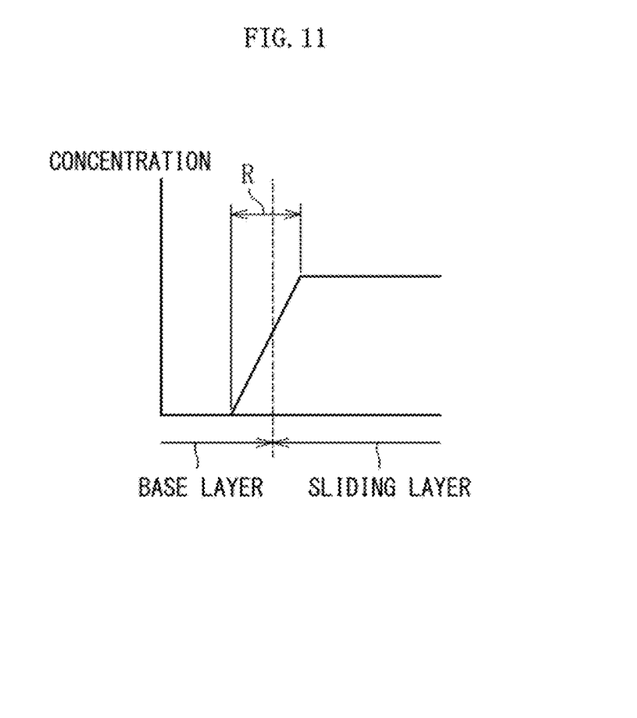
FIG. 11 is a graph for showing a concentration gradient of an alloy element for enhancing a hardening property.

The first powder M1 corresponding to the base layer 3 does not contain the alloy elements (Ni and Mo in this embodiment) for enhancing a hardening property. Therefore, theoretically, the base layer 3 does not contain the alloy elements. In actuality, however, in association with the procedure of the molding step illustrated in FIG. 3 to FIG. 8, the concentration gradient of the alloy elements is generated at an interface between the sliding layer 2 and the base layer 3 as shown in FIG. 11. With this, a region containing the alloy elements is formed in the vicinity of the interface, and hence the strength of the interface and further the binding strength between the sliding layer 2 and the base layer 3 are increased. In this case, in the base layer 3, a region sufficiently isolated from the sliding layer 2, for example, a surface (outer peripheral surface of the base layer 3 in this embodiment) having an opposed relationship with the sliding layer 2 does not contain the elements for enhancing a hardening property. It is desired that a radial dimension R of the region having the concentration gradient fall within a range of from 0.1 mm to 1.0 mm, preferably from 0.2 mm to 0.5 mm. The radial dimension R of the region having the concentration gradient can be adjusted by the radial thickness of the partition member 14 (see FIG. 3) of the two-color molding die assembly.

Figure 12A:
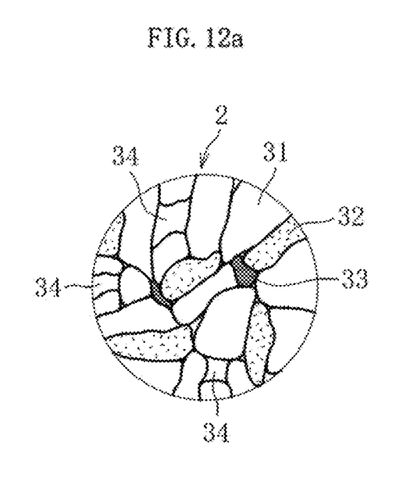
FIG. 12a is a view for illustrating a microstructure of a sliding layer.
Figure 12B:
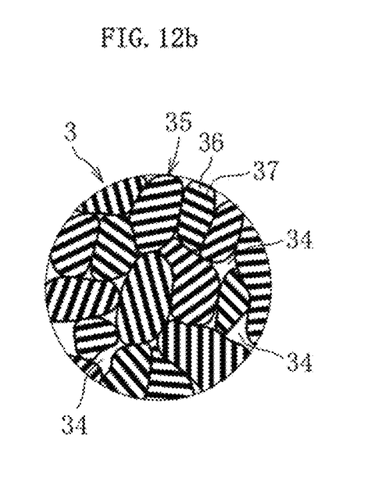
FIG. 12b is a view for illustrating a microstructure of a base layer.

In the sintered bearing 1 manufactured by the above-mentioned procedure, a microstructure of the sliding layer 2 is schematically illustrated in FIG. 12a, and a microstructure of the base layer 3 is schematically illustrated in FIG. 12b.

The sliding layer 2 is a metal structure that contains iron in the largest amount, which mainly contains an Fe-based structure and a Cu-based structure, with a part thereof being a graphite structure. Specifically, as illustrated in FIG. 12a, the sliding layer 2 comprises an Fe—C-based alloy phase 31 containing Ni and Mo as the Fe-based structure and a Cu phase 32 as the Cu-based structure. In FIG. 12a, reference symbols 33 and 34 denote a graphite phase and pores, respectively. The Fe—C-based alloy phase 31 mainly contains a martensite phase and a bainite phase and partially contains a pearlite phase. The area ratio of the Fe-based structure is larger than that of the Cu-based structure, and the area ratio of the graphite structure is smallest. In conformity with the blending ratio of the second powder M2, the sliding layer 2 contains, as main components, 10 wt % to 30 wt %

(preferably 15 wt % to 20 wt %) of Cu, 0.5 wt % to 0.8 wt % of C, 1.0 wt % to 4.0 wt % of Ni, and 0.5 wt % to 1.5 wt % of Mo, and the balance of Fe and inevitable impurities.

Further, the base layer 3 is a metal structure containing iron in the largest amount and is formed mainly of an Fe-based structure. Specifically, as illustrated in FIG. 12b, the base layer 3 comprises an Fe—C-based alloy phase 35 as the Fe-based structure. The Fe—C-based alloy phase 35 is pearlite in which ferrite 36 and cementite 37 ($Fe_3C$) are arranged alternately and Cu and P diffuse. Cu or P as particles is not present in the metal structure of the base layer 3, and a hardening structure or free graphite is not present, either. In conformity with the blending ratio of the first powder M1, the base layer 3 contains, as main components, 1.0 wt % to 5.0 wt % (preferably 2.0 wt % to 3.0 wt %) of Cu, 0.5 wt % to 0.8 wt % of C, and P, and the balance of Fe and inevitable impurities. The content of P is from 0.1 wt % to 0.6 wt % (preferably from 0.3 wt % to 0.5 wt %) with respect to Fe. The content of Cu in the base layer 3 is smaller than that of copper in the sliding layer 2, and hence the cost can be reduced by decreasing the usage amount of copper in the entire bearing.

[Improvement of Basic Configuration]

The sintered bearing 1 having the above-mentioned basic configuration can be improved by taking the following measures (1) to (3).

(1) Omission of Addition of Alloy Element Simple Substance Powder

In general, when an iron-based sintered compact is formed through use of alloyed steel powder, simple substance powder (alloy element simple substance powder) containing only the above-mentioned alloy element (any one kind or two or more kinds selected from Ni, Mo, Mn, and Cr) for enhancing a hardening property is added to the alloyed steel powder in most cases. The alloyed steel powder is generally hard and has poor compressibility, and hence it is difficult to increase the density of the sintered compact. However, a high-density sintered compact can be obtained by adding the alloy element simple substance powder to the alloyed steel powder to improve the compressibility.

Meanwhile, when the alloy element simple substance powder is added to the alloyed steel powder as described above, the simple substance powder cannot sufficiently diffuse into the Fe structure, and particles of the alloy element may remain in the metal structure after sintering. When such particles remain in the sintered bearing 1, the mechanical strength, in particular, the radial crushing strength of the sliding layer 2 and further the entire sintered bearing 1 is decreased. In order to prevent this problem, it is necessary to perform heating at a high temperature of 1,200° C. or more for 8 hours or more during sintering to cause all the alloy element to diffuse into the Fe structure, which causes trouble in mass-production to increase cost significantly.

From the above-mentioned viewpoint, in an application in which the increase in density is not so required as in the sintered bearing 1, it is preferred that the alloy element simple substance powder not be added to the second powder M2 forming the sliding layer 2. That is, alloyed steel powder containing all the alloy elements for enhancing a hardening property in the sintered compact is used. With this, all the alloy elements in the structure are alloyed with the Fe-based structure after sintering of the sintered bearing 1. Thus, remaining austenite can be reduced to avoid the decrease in strength of the sintered bearing 1.

(2) Reduction in Particle Diameter of Copper Powder

As the copper powder to be added to the second powder M2 forming the sliding layer 2, copper powder having a small particle diameter is preferably used. The reason for this is as follows.

In the present invention, the temperature in a furnace during sintering is close to the melting point of copper, and hence a part of the copper powder contained in the sliding layer 2 may be melted during sintering. The molten copper powder moves to the base layer 3, and along with this, pores corresponding to the size of the copper powder having moved to the sliding layer 2 are generated. When the particle diameter of the copper powder is large, a large number of coarse pores are formed in the sliding layer 2. Therefore, the strength of the sliding surface A is decreased, and there is a risk in that the sliding surface may be deformed when a shock load or the like is applied. Further, when the particle diameter of the copper powder is large, copper does not easily diffuse into Fe particles. Therefore, the binding strength between the Fe particles of the sliding layer 2 is decreased to cause a decrease in strength of the sliding surface A. From the above-mentioned viewpoint, as the copper powder to be used in the second powder M2 corresponding to the sliding layer 2, copper powder having a particle diameter of less than 45 μm in a ratio of from 70 wt % to 100 wt % of the entire copper powder is used.

In the second powder M2 using the copper powder having a small particle diameter as described above, a ratio d2/d1 of an average particle diameter (d2) of the copper powder with respect to an average particle diameter (d1) of the alloyed steel powder is 1/5 or more and 1/2 or less, preferably 1/4 or more and 1/3 or less. The reason for this is as follows. When this ratio is more than the upper limit value, there arises a problem of coarsening of pores. When the ratio is less than the lower limit value, there arises a problem in that the flowability of the powder is decreased to deteriorate the moldability. Further, a ratio (p2/p1) of a blending amount p2 of the copper powder with respect to a blending amount p1 of the alloyed steel powder is 1/6 or more and 1/3 or less, preferably 1/5 or more and 1/4 or less. The reason for this is as follows. When this ratio is more than the upper limit value, there arises a problem of a decrease in strength. When the ratio is less than the lower limit value, there arises a problem of a decrease in sliding property.

(3) Addition of Low-Melting-Point Metal

In the sintered bearing 1 having the basic configuration, the sliding layer 2 does not contain a low-melting-point metal, but any one (for example, Sn) of the above-mentioned low-melting-point metals may also be added to the second powder M2 forming the sliding layer 2. With this, during sintering, Cu contained in the second powder M2 easily diffuses into the Fe structure, and the binding strength between the Fe particles is increased. Therefore, the mechanical strength of the sliding layer 2 and further the entire sintered bearing 1 can be increased. The low-melting-point metal may also be added to the sliding layer 2 through use of powder alloyed with copper instead of the addition of simple substance powder thereof to mixed powder. The ratio of the low-melting-point metal with respect to the copper powder in the second powder M2 is 0.5 wt % or more and 5.0 wt % or less, preferably 1.0 wt % or more and 3.0 wt % or less. The reason for this is as follows. When this ratio is more than the upper limit value, there arises a problem of segregation. When the ratio is less than the lower limit value, there arises a problem of a decrease in strength.

[Confirmation Test]

In order to confirm the effects of the measures (1) to (3) described above, test pieces No. 1 to No. 5 described below were manufactured, and each test piece was measured for dry density, oil percentage, radial crushing strength, Vickers hardness, and Rockwell hardness. The test pieces No. 1 to No. 5 are different only in composition of the second powder M2 (corresponding to the sliding layer 2), and the composition of the first powder M1 (corresponding to the base layer 3), the molding conditions of the test piece, and the sintering conditions are the same. The first powder M1 has a composition containing 3.0 wt % of copper powder, 0.8 wt % of graphite powder, and the balance of alloyed steel powder of iron and phosphorus and iron powder in any test piece.

The second powder M2 of each test piece is obtained by adding Ni simple substance powder and Sn powder to base powder in the following ratios. Here, the base powder is obtained by blending 20 wt % of copper powder and 0.8 wt % of graphite powder, with the balance excluding the Ni simple substance powder and the Sn powder being Fe—Ni—Mo-based alloyed steel powder. The copper powder used in the second powder M2 of the test piece No. 4 has a particle diameter of less than 45 μm in a ratio of from 70 wt % to 100 wt % of the entire copper powder. However, the copper powder used in the second powder M2 of the test pieces (No. 1 to No. 3 and No. 5) other than the test piece No. 4 has a particle diameter of less than 45 μm in a ratio of from 10 wt % to 30 wt % of the entire copper powder. That is, the copper powder used in the second powder M2 of the test piece No. 4 has a particle diameter smaller than that of the copper powder used in the second powder M2 of the other test pieces.

Test piece No. 1 . . . base powder+1.0 wt % of Ni simple substance powder+1.0 wt % of Sn powder Test piece No. 2 . . . base powder+1.0 wt % of Ni simple substance powder+0.8 wt % of Sn powder Test piece No. 3 . . . base powder+1.0 wt % of Ni simple substance powder+0.5 wt % of Sn powder Test piece No. 4 . . . only base powder (0% of Ni simple substance powder and 0% of Sn powder)

Test piece No. 5 . . . base powder+1.0 wt % of Ni simple substance powder (0% of Sn powder)

[Discussion 1]

Figure 13:
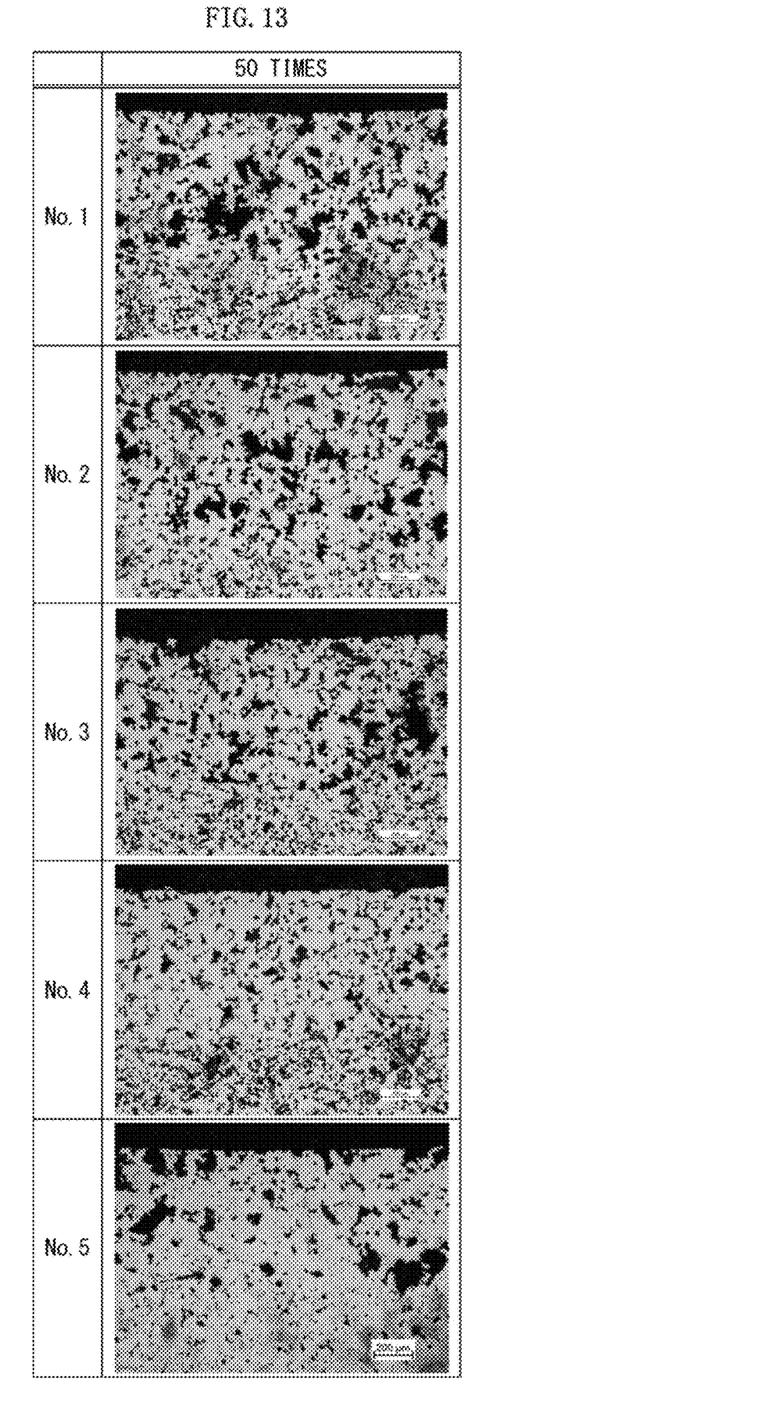
FIG. 13 is a micrograph of each test piece.
Figure 14:
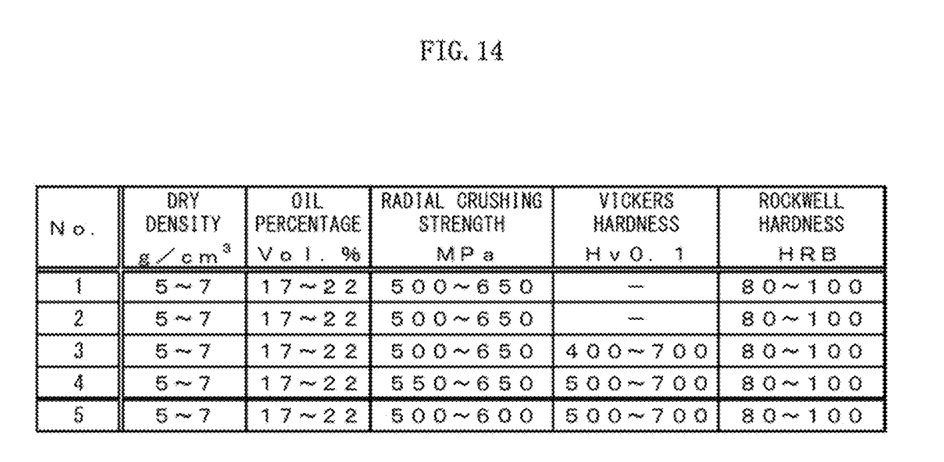
FIG. 14 is a table for showing results of a confirmation test.

A micrograph of each of the test pieces No. 1 to No. 5 is shown in FIG. 13, and test results are shown in FIG. 14.

The following tendency can be read from both the figures.

It is understood from the comparison between the test piece No. 4 and the test piece No. 5 that the radial crushing strength is increased when the addition of the Ni simple substance powder is omitted.

The test piece No. 4 has the most satisfactory dispersion state of the Cu structure and the pores.

It is understood from the comparison between the test pieces No. 1 to No. 3 and the test piece No. 5 that the radial crushing strength is increased when the Sn powder is added. However, the effect thereof is less satisfactory as compared to that of the test piece No. 4.

It can be understood from the above-mentioned analysis results that the test piece No. 4, that is, the test piece in which the Ni simple substance powder is not added to the second powder M2 corresponding to the sliding layer 2 (measure 1) and the copper powder of the second powder M2 is set to have a small particle diameter (measure 2) is most effective for increasing the radial crushing strength. With this, a radial crushing strength of 550 MPa or more, preferably 600 MPa or more can be obtained. It is conceivable that the radial crushing strength can be further increased by adding the Sn powder to the second powder M2 (measure 3) in addition to the above-mentioned measures. Further, it is considered that the measure 1 is more effective for increasing the radial crushing strength as compared to the measure 2. For information, the ratio of the pores with respect to the entire sliding surface in the test piece No. 4 was from about 20% to about 40% in an area ratio.

[Discussion 2]

Next, the test pieces No. 1 to No. 3 and the test piece No. 5 are compared and discussed. The Ni simple substance powder is added to the second powder M2 of each of the test pieces No. 1 to No. 3 and the test piece No. 5. The reason for adding the Ni simple substance powder to the second powder M2 is as follows. The alloyed steel powder is hard and has poor compressibility, and hence it is difficult to increase the density of the sintered compact only with the alloyed steel powder. However, when the Ni simple substance powder is added to the second powder M2, the compressibility is improved, and a high-density sintered compact can be obtained. If this point does not cause a problem, the addition of the Ni simple substance powder may be omitted.

It can be understood from the comparison between the test pieces No. 1 to No. 3 and the test piece No. 5 (Comparative Example) of FIG. 14 that the radial crushing strength is increased by adding the Sn powder to the second powder M2 corresponding to the sliding layer 2. It can also be understood from FIG. 13 that, when the Sn powder is added to the second powder M2 as described above, Cu further diffuses into the Fe—C-based alloy phase of the sliding layer 2, and Cu diffuses also into the Fe—C-based alloy phase of the base layer 3, with the result that the inner pores can be made finer. Thus, when the low-melting-point metal powder, such as the Sn powder, is added to the second powder M2, the radial crushing strength and the strength of the sliding surface A can be increased irrespective of whether or not the alloy element simple substance powder, such as Ni, is added to the second powder M2 or whether or not the copper powder of the second powder M2 is reduced in particle diameter.

Other Embodiments

Figure 15:
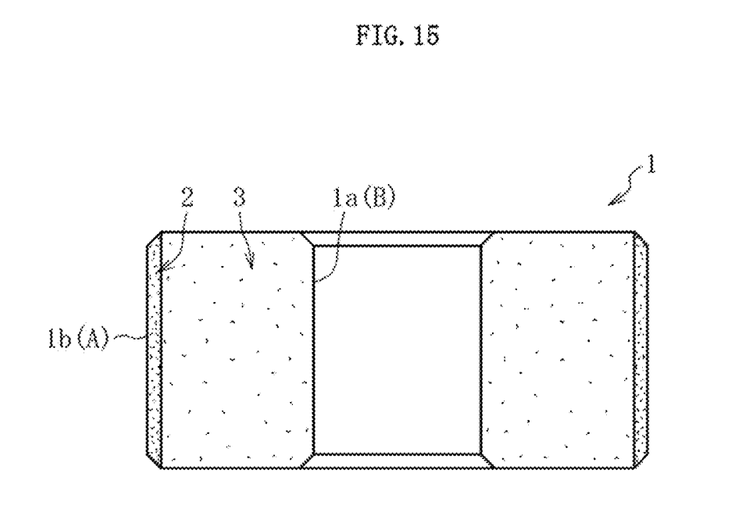
FIG. 15 is a sectional view of a sintered bearing according to another embodiment of the present invention.

The above-mentioned embodiment exemplifies a case where the sliding surface A is formed on the inner peripheral surface 1a of the sintered bearing 1, but the present invention is not limited thereto. For example, as illustrated in FIG. 15, it is also possible to form the sliding surface A on the outer peripheral surface 1b of the sintered bearing 1 and form the mounting surface B on the inner peripheral surface 1a. In this case, the sliding layer 2 is formed on the radially outer side of the sintered bearing 1, and the base layer 3 is formed on the radially inner side of the sintered bearing 1. The configurations and functions of the sliding layer 2 and the base layer 3 are common to those of the sliding layer 2 and the base layer 3 in the embodiment described above. In addition, in FIG. 1, when the end surface of the sintered bearing 1 slides with the first arm 6 under high contact pressure, the sliding surface A may be formed also on the end surface of the sintered bearing.

Further, the sintered compact M' and the sliding surface A may each have any form, and the present invention can be applied, as the sliding member, to a spherical bush and a flat pad-like member (for example, a boom pad). In the case of the former, the sliding surface A has a spherical shape, and in the case of the latter, the sliding surface A has a flat surface shape. One or a plurality of recessed portions (for example, groove-like portions) can also be formed on the sliding surface A. With this, the recessed portions can be utilized as a lubricant retainer.

Further, the above-mentioned embodiment exemplifies a case where the interface between the sliding layer 2 and the base layer 3 is assumed to have a cylindrical surface shape, but the present invention is not limited thereto. A cross section of the interface orthogonal to an axis can be formed into a non-circular shape (for example, polygonal shape or spline shape) (not shown). Thus, the binding strength between the sliding layer 2 and the base layer 3 is further increased. The shape of the interface is formed in conformity with a shape of the partition member 14 (see FIG. 3 and the like) in the compression molding step, and hence the shape of the interface can be changed through change of the shape of the partition member 14.

Further, the above-mentioned embodiment exemplifies a case where the sintered bearing 1 is applied to construction machinery, but the present invention is not limited thereto. The sliding member of the present invention can be preferably applied to various applications to be used on a sliding surface under a high contact pressure condition.

REFERENCE SIGNS LIST 1 sintered bearing
1a inner peripheral surface
1b outer peripheral surface
2 sliding layer
3 base layer
4 pin (axis)
6 first arm
7 second arm
20 sintering furnace
31 Fe-based structure (Fe—C alloy phase)
32 Cu-based structure (Cu phase)
33 graphite structure (graphite phase)
34 pore
35 Fe-based structure (Fe—C alloy phase)
36 ferrite
37 cementite
A sliding surface (bearing surface)
B mounting surface
M green compact
M' sintered compact
M1 first powder
M2 second powder

The invention claimed is:

1. A sliding member, which is formed of a sintered compact and has a sliding surface that slides with another member,
the sliding member comprising:
a base layer, which mainly contains an Fe-based structure and further contains 1.0 wt % to 5.0 wt % of Cu, an element having a melting point lower than a melting point of Cu, and C, the element with a melting point lower than a melting point of Cu being any of Sn, Zn and P; and
a sliding layer, which is sintered together with the base layer in a state of being held in contact with the base layer and has the sliding surface, the sliding layer mainly containing an Fe-based structure that contains an alloy element and a Cu-based structure, and further containing C, the sliding layer having a content of Cu larger than a content of Cu in the base layer,
wherein all the alloy element contained in the sliding layer is alloyed with the Fe-based structure,
wherein the sliding layer does not include particles of alloy element;
wherein a pearlite phase is formed in the Fe-based structure of the base layer,
wherein at least a part of the Fe-based structure contained in the sliding layer contains a martensite phase and a bainite phase,
wherein the sliding layer contains Cu in a content of from 10 wt % to 30 wt %,
wherein a radial thickness of the sliding layer is 1% to 20% of a radial thickness of the sliding member, and
wherein the sliding member has a radial crushing strength of 500 MPa or more.

2. The sliding member according to claim 1, wherein the alloy element comprises at least one kind selected from Ni, Mo, Mn, and Cr.

3. The sliding member according to claim 1, wherein the Cu-based structure of the sliding layer contains copper powder having a particle diameter of less than 45 μm in a ratio of from 70% to 100% of the entire copper powder.

4. The sliding member according to claim 1, wherein the sliding layer further contains an element having a melting point lower than a melting point of Cu.

5. The sliding member according to claim 1, wherein the element having a melting point lower than a melting point of Cu contained in the base layer comprises P.

6. The sliding member according to claim 1, wherein the base layer contains the element having a melting point lower than a melting point of Cu in a content of from 0.1 wt % to 0.6 wt % with respect to Fe.

7. The sliding member according to claim 1, wherein the sliding member is used as a bearing of a joint section of an arm of construction machinery.

8. A sliding member, which is formed of a sintered compact and has a sliding surface that slides with another member,
the sliding member comprising:
a base layer, which mainly contains an Fe-based structure and further contains 1.0 wt % to 5.0 wt % of Cu, an element having a melting point lower than a melting point of Cu, and C, the element with a melting point lower than a melting point of Cu being P, wherein a content of P with respect to Fe in the base layer is from 0.3 wt % to 0.5 wt %; and
a sliding layer, which is sintered together with the base layer in a state of being held in contact with the base layer and has the sliding surface, the sliding layer mainly containing an Fe-based structure that contains an alloy element and a Cu-based structure, and further containing Sn having a melting point lower than a melting point of Cu, and C, the sliding layer having a content of Cu larger than a content of Cu in the base layer, wherein the sliding member has a radial crushing strength of 500 MPa or more,
wherein a pearlite phase is formed in the Fe-based structure of the base layer,
wherein at least a part of the Fe-based structure contained in the sliding layer contains a martensite phase and a bainite phase,
wherein the sliding layer contains Cu in a content of from 10 wt % to 30 wt %, and
wherein a radial thickness of the sliding layer is 1% to 20% of a radial thickness of the sliding member.

9. The sliding member according to claim 8, wherein the alloy element comprises at least one kind selected from Ni, Mo, Mn, and Cr.

10. The sliding member according to claim 8, wherein the Cu-based structure of the sliding layer contains copper powder having a particle diameter of less than 45 μm in a ratio of from 70% to 100% of the entire copper powder.

11. The sliding member according to claim 8, wherein the sliding member is used as a bearing of a joint section of an arm of construction machinery.

\* \* \* \* \*